Dec. 17, 1968     E. C. YOUNG     3,416,750
APPARATUS WITH MULTIPLE PURPOSE COMPONENTS FOR ENABLING
THE SERVICEABILITY AND MANEUVERABILITY OF A CRAFT
Filed Oct. 20, 1965     4 Sheets-Sheet 1

INVENTOR.
Everett C. Young

Dec. 17, 1968  E. C. YOUNG  3,416,750
APPARATUS WITH MULTIPLE PURPOSE COMPONENTS FOR ENABLING
THE SERVICEABILITY AND MANEUVERABILITY OF A CRAFT
Filed Oct. 20, 1965  4 Sheets-Sheet 4

INVENTOR:
EVERETT C. YOUNG

United States Patent Office 3,416,750
Patented Dec. 17, 1968

3,416,750
APPARATUS WITH MULTIPLE PURPOSE COMPONENTS FOR ENABLING THE SERVICEABILITY AND MANEUVERABILITY OF A CRAFT
Everett C. Young, 19465 Lorain Road, Fairview Park, Cuyahoga County, Ohio 44126
Continuation-in-part of application Ser. No. 306,175, Sept. 3, 1963. This application Oct. 20, 1965, Ser. No. 498,358
31 Claims. (Cl. 244—1)

ABSTRACT OF THE DISCLOSURE

Disclosed is a spacecraft with multi-purpose components of which one in particular is an ablative protective cover comprising reentry means involving composite structures with functionally different ablation modes of the type disclosed in Patent 3,231,219 and which relates to a re-entry surface portion comprising a compartmentalized framework with various special ablative materials in the compartments of said framework.

---

This invention relates to protective havens in space and re-entry vehicles, and more particularly, to stricken craft in space flight and to craft in flight just before a space journey or just before atmospheric re-entry, and which during such flight need proper servicing, protection, and maneuvering assistance not only for the spacecraft itself during such flight and/or re-entry but for the operator or occupants of such craft as well. Also, in the event of power failure or other malfunction on a spacecraft in flight it will be necessary to send a rescue craft or retrieval ship into space to rendezvous with such a stricken craft and either service it while in flight or transfer the occupant or occupants from the craft to the rescue ship and transport them and their equipment back to the planet whence they came or transfer these occupants to another spacecraft, space station, or space haven.

This is a continuation-in-part of my copending application Serial No. 306,175 filed Sept. 3, 1963, now issued Patent No. 3,231,219. The art illustrated in the drawings is identical to the three sheets of drawings in the parent or said copending application. Hence, one of the reasons for filing this continuing application is to continue describing and claiming only the art or subject matter disclosed in the said copending application in order to reveal more completely the advantages and improvements of the multiple purpose functions of the various components in the invention and just how these functions aid in enabling the serviceability and maneuverability of a craft in space and during re-entry. Also it is intended to describe how this multiple purpose invention is used as an orbiting observatory, orbiting space service station, and a retrieval ship.

Space, interstellar space, and outer space when used in this application refers to that physical environment beyond one hundred miles from our planet earth or beyond any planet's atmosphere, to the space that surrounds those heavenly bodies or other planets that have no atmosphere, and more particularly to the space between all bodies in our universe which is termed interstellar space.

Throughout the ensuing specification and claims the term "haven" is intended to cover any protective cover, refuge, or protective enclosure used for safety and/or for servicing means when incorporated with any spacecraft, re-entry vehicle, space port, or re-entry device.

The term "haven" is also used interchangeably with the term "buffer" throughout this application because it is very obvious that the buffer described, claimed, and illustrated in the drawings in the said copending application not only serves as a heat insulator for spacecraft during atmospheric re-entry but it also serves as a haven or port in space to offer a place of safety for the astronaut and a port for his craft. This haven also provides multiple purpose functions whereby it can be separated from a craft and left in orbit for future use by the same craft or another craft having similar linking or connecting means, or it can be boosted into orbit from an earth based launching apparatus to serve as a future refuge and servicing unit for stricken spacecraft or for similar craft prior to re-entry. It is also equipped with rendezvous and docking means and it also comprises a venting arrangement whereby depressurization of a pressurized chamber can be conveniently effected. Also, it is apparent that when the haven is made much larger it will be able to accommodate more than one spacecraft for servicing and repairing operations.

There is good reason to believe that a rescue ship capability is needed in space exploration and definitely should be considered. Any man-made design or system or anything man is capable of constructing is susceptible to malfunction and therefore an orbital rescue technique is needed as a back-up safety feature for man's endeavors in outer space. Rocket experts confirm, that thousands of explosions, accidents and mishaps clearly indicate that one cannot rule out the chance that the retro-rockets will not perform as they should because of unstable burning, burnout, or that they might not even ignite at all. Also, there is the possibility of damage to the retro rockets as a result of impact with micrometeoroids, large meteoroids, and cosmic particles. A spaceship might even run into showers of meteoroids and thus these rockets become damaged. Therefore, another backup system is needed to provide additional safety so that the operator of such a craft can depend on another reliable device to help him carry out his plans for a space journey or for re-entry.

In orbital rendezvous it is necessary to send the rescue ship into nearly the same orbital path as the stricken craft. Once the retrieval ship moves in for rendezvous and rescue there are two methods that can be utilized. One method is for the astronauts in the first ship to leave their cabin or capsule through an escape hatch, hang on to their ship by hand, being protected only by their insulated space suits. At this time the rescue ship will move quite close to the disabled ship and by help of magnetic lifelines or electromagnetic wings or appendages rescue the astronauts or pilot of such disabled ship. The other method is whereby a protective haven or port orbiting in space has connecting or linking means for the stricken ship to dock within. Then by using an air lock or depressurization system transfer men from the stricken craft to the living quarters or piloting quarters inside the haven and then return these men to earth or to another craft or space station.

It is a well known fact that most exploration throughout the history of man's endeavors to search the unknown has caused the deaths of many brave and courageous men, and it is for this reason that it is quite likely that astronauts of the future may perish for reasons beyond their own control. Therefore, it is time to incorporate such a rescue ship, a space haven, or re-entry control system that will provide astronauts with additional security so that they will not fear too much about being stranded in space with no possible chance for rescue. Also by providing such backup rescue arrangements it will have shown our astronauts and the world that we place a great emphasis on human life.

Therefore, the primary object of the invention is to provide a spaceship with a special buffer or protective haven of sufficient size and thickness, capable of performing multiple purpose functions one of which is to protect the front and sides of a spacecraft during atmospheric re-entry so that when said craft is in transit reaction with an atmosphere during re-entry there will be a minimum of heat penetration. As illustrated and described in the drawings and specification in this application and in my other copending application Ser. No. 306,175 filed Sept. 3, 1963, the use of Dry Ice as a refrigerant is very important in the refrigeratory apparatus installed within the spacecraft. Dry Ice provides additional insulation against high temperatures and heat penetration simply because materials upon the spacecraft which are maintained in a cold or super cooled condition will naturally take longer to heat up than if the same materials were left at their normal temperature or at a temperature higher than 32 degrees Fahrenheit for example. Dry Ice or solid carbon dioxide has a temperature of approximately —110 degrees Fahrenheit below zero and when placed adjacent to or beside another material will super cool that material in a short time. Super cooling the anterior nose portion of a spacecraft prior to re-entry then is very advantageous.

Another primary object of this multipurpose protective haven or buffer equipped with a refrigeratory apparatus is that it can be separated from the spacecraft while in space flight or in orbit, left orbiting a planet, and then when engaged again by a craft, form or make it possible to enclose a chamber which can be utilized by pumping pressurized oxygen into it, or the chamber can be depressurized to permit the occupant or occupants of the spacecraft to climb into it before going out into the vacuum of space to make repairs on their craft or space haven, or merely to make visual observations.

It should be easily comprehended as to why many, perhaps hundreds or even thousands of orbiting covers or havens of similar engaging components could be left orbiting in space or even launched into the orbital path from a planet based launching platform. All of these components can be launched from a space station or even assembled in space, and these protective havens and other components used to service a spacecraft while in space flight, in orbit before re-entry, or in orbit before a long journey through interstellar space. Also it is apparent that when said haven is made much larger it will be possible for a spacecraft to completely enter inside it and be completely serviced and/or repaired. Also, a larger haven could return to earth with a number of men inside or even bring scientific equipment or supplies from other planets being explored. For that matter this multiple purpose shelter or haven, when made much larger, could even be used to house spacecraft service attendants, pilots, and other men and women voyagers enroute to some destination in outer space or on planet earth. Actually such a mammoth haven would in effect be an orbiting space station, orbiting observatory, or space platform. By merely linking together quite a number of these havens or housings it would be quite possible to construct a small apartment like structure with all the conveniences of an earth based shopping center.

It is obvious why differential ablation on the forward surface of such a protective haven or buffer will help to keep the craft oriented during re-entry and keep it in a fixed position. As explained and claimed in the parent and copending application Serial No. 306,175 filed September 3, 1963, this buffer or protective haven has means for differential ablation whereby the forwardly disposed materials progressively ablate at different rates when imposed by high velocity re-entry to form stabilizing fins which thereby keep the craft in an upright and piloting position. Phenolic asbestos or plastic and beryllium can be used for such differential ablation whereby the fins are constructed of beryllium which has a higher kindling temperature than the plastic segmented sections between said fins.

In column eleven (A) in the specification of Patent 3,231,219 it is of great significance to note the importance of reinforcing members such as metal lath in a framework consisting of said lath and grill fins to hold, contain, and reinforce ablative material such as the dry sand core. This framework comprising the grill fins, stabilizer fins, and reinforcing metal lath form a compartmentalized and/or multi-cellular design covering the entire anterior portion of the buffer structure. It stands logical that the best desired use of these metal laths would be one wherein each lath is located at right angles to the grill fins and the stabilizer fins and since this lathwork covers the entire anteriorly disposed surface of the buffer it therefore also serves as reinforcement for holding and containing any other ablative material such as plastic or the like during re-entry ablation, and which is more clearly defined or illustrated in FIGURE 6 in Patent 3,231,219 and FIGURE 6, FIGURE 9, FIGURE 10, and FIGURE 11 in this application. Also noted particularly in FIGURE 6 wherein the partial cross sectional view of the buffer shows that the plastic is of sufficient thickness for harnessing the natural forces of burning during re-entry ablation and that this thickness extends from the anterior surface of the buffer inwardly to the inside metal shield surface of the buffer wherein the inner beryllium shield and metal net-like construction combine to form the whole inner shield-like structure.

Another feature or object of this invention is not only to have a component such as the multipurpose cover attached to a craft but also to have a multiple purpose retro system which can be left in orbit for future re-entries or for powered flight in space. Again here as with the protective haven perhaps thousands of these retro systems could be placed into orbit from ground launching positions or assembled on space platforms and then placed into orbit. Then at a later time space ships returning from a space journey could link up with or dock within such a retro system and then use it for braking means during re-entry or use it for powered flight for another journey through space. This same system can be used for altering the orbiting altitude of the spacecraft. Also this same retro system coupled with the use of the propulsion system under the wings of this invention can be used to either increase or shorten the orbiting altitude and for increasing or decreasing speed when rendezvousing with another orbiting craft. Merely by using the thrust from the retro system will slow the speed enough so that the craft will orbit in a different perigee or apogee from earth or a planet. When the rocket propulsion system under the wing is used the spacecraft will increase its forward velocity and therefore take on another orbital path further from a planet. Thus by using both the retro system and the propulsion system the craft can be made to orbit a panet in a more circular path or even a more elliptical path as desired.

Another important multiple purpose function of the protective haven or buffer and another important object of the invention is that the spacecraft is equipped with venting means whereby a chamber or vessel on said craft can be vented when a portion of the craft is opened in the vacuum environment of space. Also, this space haven or space port, somewhat akin to the carport on earth or a hanger at an airport, could have many openings or docking positions located upon it whereby craft could maneuver into said port and be serviced.

This venting procedure can either be accomplished by slow escapement of air through a small opening in the craft and/or spaceport or accomplished quickly by sudden opening. For that matter, debris, dust particles, and bacteria undergoing weightlessness within said craft can easily be removed from within by such venting means, and thus a vacuum cleaning condition involving a rushing of air from one location to another can be created. This vacuum cleaning method within a spacecraft can thus be accomplished perhaps in a much simpler manner than that done in the common household on earth whereby the common electrical vacuum sweeper is employed.

According to available data made from careful studies and fully described at length in my copending application Ser. No. 306,175 filed Sept. 3, 1963, it is apparent that a strong parallelism exist between a meteorite fall and the re-entry of a nose-cone, data-capsule, or other re-entry vehicle into the atmosphere. The fact that a meteorite which survived a blazing flight through the atmosphere and lands on the ground in a cold condition can best be explained by elementary reasoning. It is only logical that a cold material will take longer to heat up than a material at a normal temperature or temperature higher than the colder material. Man has been surrounded by the heat and cold phenomenon ever since he was created and his very existence or well being has a lot to do with the temperature of his environment. Yet, this same phenomenon, so elementary and reasonable has apparently escaped unnoticed by men with scientific minds. Perhaps the answer or solution to re-entry materials was so very simple that learned minds looking for a complicated method missed the best and most logical solution, that of utilizing frozen or super cooled materials and permitting them to ablate during transit reaction with an atmosphere during re-entry. Therefore, since the meteorite which has been traveling in space where the temperature has been estimated at −459 degrees Fahrenheit below zero, will naturally arrive on the ground in a cold condition since during its blazing entry the forwardly disposed materials were stripped away as fast as new fresh cold material was exposed to ablation.

Therefore, the many advantages of using a refrigerant such as Dry Ice in this invention cannot be overemphasized. Dry Ice has always been used as a refrigerant in railway cars and trucks and even in ice cream stores primarily because it not only does an excellent job of maintaining materials and products in a cold condition but as it sublimates it leaves no water vapor and leaves no appreciable mess and thus no housecleaning is required.

The primary advantage of utilizing Dry Ice as an insulator within spacecraft is that it is possible for it to be stored in its gaseous state, processed into a solid state and then through physical retrogression return to its original gaseous state again. Also, carbon dioxide can be pumped into the insulating device enclosing a spacecraft and then by using a refrigerant such as liquid hydrogen freeze the carbon dioxide into Dry Ice. Actually Dry Ice will dissipate the heat from a torch flame 100% laterally if the torch is applied directly to it. Sometimes the subliminating Dry Ice or escaping carbon dioxide gas will even put out the flame. Therefore, when solid carbon dioxide is used upon the ablating nose portion of any craft during re-entry would offer the same protection as would be expected from a simple fire extinguisher on earth. Also when stored in this invention in outer space it could be used to refrigerate those materials or products exposed to the sun. Naturally it could be used to maintain foods and even chemicals or other scientific materials in a cold condition.

Since disclosing the method and advantages of Dry Ice as an insulator for spacecraft in my copending application Ser. No. 306,175 filed Sept. 3, 1963, and since sending written descriptions and disclosures to certain scientists within the United States, other investigations confirm my findings. In this connection the National Aeronautics and Space Administration's Langley Research Center, Langley Field, Va., and the Convair Division of General Dynamics Corporation are investigating the advantages of Dry Ice as evidenced by an article entitled, "Dry Ice May be Used as Spacecraft Insulation," Science News Letter, 88: 73, July 31, 1965, page 73.

Another object of the invention involving this multiple purpose haven or buffer construction is to design the anterior portions of such a haven with a destructible type construction so that when the materials are exposed to aerial ablation during re-entry will progressively ablate and gradually produce a less blunt configuration and take on more of a hypersonic shape as the haven or buffer descends further and further into the denser portion of a planet's atmosphere. Such materials perhaps of phenolic asbestos, plastic, or other destructible type ablative material will when undergoing such ablation reduce the pressure of the shock wave ahead of said cover during re-entry since the anterior shape being exposed to atmospheric re-entry will continually become less blunt and take on the appearance of a streamlined shape or hypersonic configuration.

An important feature of the construction of this haven or shield as it may be called is that it incorporates a honeycombed protector or honeycomb matrix filled with an ablative material such as Dry Ice. It should be easily comprehended now as to how this honeycomb matrix filled with Dry Ice or other ablative material forms a good protector or insulative means for a spacecraft during re-entry as the heat produced from atmospheric friction will be radiated away or channeled away from the sides of the craft and thus protect the astronauts inside from extreme high temperatures.

Another object of the invention is to utilize a vacuum compartment or compartments within a spacecraft for insulative purposes. This vacuum can be used alongside or adjacent to Dry Ice and not only help preserve the Dry Ice in its original solid state but will serve as insulation against heat penetration during re-entry. It also serves as an insulator in the portion of a craft facing the sun. It should be obvious then why heat cannot penetrate a portion of a craft using a vacuum insulator. The heat from the sun or heatup from re-entry cannot get through the vacuum by convection or conduction. The only way that heat might get through the vacuum is by radiation but then this is impossible with this invention because when the Dry Ice is employed alongside the vacuum it will prevent heat penetration 100%. Also in the case whereby fiery heat might strike the Dry Ice this kind of heat will be dissipated laterally by the Dry Ice and in many cases the flame of such fiery heat will be completely extinguished since the sublimating carbon dioxide gas from the Dry Ice is actually acting as an extinguisher of fire.

It is important to note in the drawings that this invention employs combustion and/or ablation on the forwardly positioned buffer and/or haven. It is also intended for the rearwardly disposed shuttlecock drag device to employ combustible materials which can be burned away and thus upon re-entry the drag device will be burned off. However, this shuttlecock drag can be retracted if need be and it also can be ejected from the spacecraft and left in orbit for future use by the same craft or another craft. As mentioned in my copending application Ser. No. 306,175 filed Sept. 3, 1963, air resistance during re-entry produces heat and flame which retards velocity and while ablation and/or vaporization of the anterior portion of the protective cover or buffer is a by-product of friction it nevertheless serves as a natural "brake" as the heat and flame set up an aerodynamic drag in the surrounding airstream. During early stages of re-entry the burning buffer utilizes the advantage of said aerodynamic drag in the most natural way somewhat akin to the same manner in which meteorites are slowed during their fiery entry into earth's atmosphere. Then during later stages of re-entry the shuttlecock drag device on the rear of the craft can be set afire and this combustion alone will further slow the speed of said craft prior to maneuverable flight to a landing.

Still another object of the multiple purpose buffer is to provide it with means to enlarge the size of it before re-entry or even during re-entry. By controlling the size of the buffer or haven by use of extensible or enlargening means it becomes apparent how easy it is to increase the braking action and increase the resistance to its passage through the atmosphere.

Still another object of this invention is to provide various extensible appendages which can be ejected or extended outwardly from the craft to contact a stricken craft in space and thus be able to secure the rescue craft alongside the said stricken craft so that the occupants can be rescued and taken aboard the rescue craft.

Still another object of the invention is to provide a spacecraft with means to exit a planet's atmosphere, have maneuverable and powered flight in space in any direction, have means for atmospheric re-entry, and then be able to use maneuverable flight and propulsion again in an atmosphere. The multiple purpose retro rocket system on the hypersonic end of this invention is provided with means to actually propel a spacecraft from a planet into outer space when the tapered end of the craft is pointed skyward and these powerful rockets fired. Such a rocket system comprising four rockets does not need a complicated launching apparatus such as presently used to propel craft into space. These rockets need only enough thrust to power the craft into the thin upper reaches of the atmosphere wherein the whole spacecraft or apparatus can be turned around and then by firing the pair of rockets under the extensible wing sections propel the craft into an orbital path or even toward another destination in outer space. It is important to remember here that after these retro rockets are spent or have exhausted their fuel supply they can be separated from the craft and then when the pilot of such a craft needs another retro system or rocket pack he merely maneuvers his craft into such a system that is orbiting a planet. The spent retro system can then be serviced in flight or it can be captured and returned to a space station for repairs and servicing. It is important to mention that these retro rockets can also be used to abort flight of a craft if launched from a launching pad on the ground or surface of a planet. As mentioned before there could be thousands of these retro systems and protective havens or buffers placed into orbit from the earth or other planet or even from a space station. A craft operating from a space station can actually fly out from a space station and using the separating means disclosed and illustrated in this application leave or launch these multiple purpose components consisting of the retro system, the haven, and the shuttlecock drag. Merely by braking the main fuselage body during space flight will cause the haven or buffer to separate and continue orbiting a planet. Also by reversing the craft and again braking the fuselage body by use of the propulsion rockets under the wings it is apparent why the retro rocket systems will separate and remain in orbit for future use.

Another object of the invention is to provide a space apparatus with vane means or orientation means to give the apparatus pitch, roll, and yaw and thus be able to place the invention in various positions in outer space so that when the propulsion system under the wing sections are ignited or fired will propel the craft in the desired direction. These vanes are intended to be used by the pilot during lift off or while exiting an atmosphere in order to help him steer the craft into the correct orbital path or position. Thus the use of these vanes during ascent can actually aid in preventing many aborted flights. Also, by using these vanes or such orientation means and propulsions means a craft can be made to leave the orbital path and be propelled toward a planet's atmosphere. This feature is especially useful as a backup safety system in the event retro rockets fail or other braking devices fail prior to re-entry. Also since both the propulsion system and the retro rocket system have their exhaust ends positioned in opposite directions it is easily understood how the craft can change direction of flight in space and propel itself in an entirely different or opposite direction.

The importance of having ejectable or separable components on the front and rear of a spacecraft such as the buffer and the retro rocket system cannot be overemphasized. Furthermore the ability to rendezvous with either component in space and thus be serviced is even more important. Due to the weight penalty in boosting large payloads into space and the additional weight of such systems as retro rockets and protective havens or heat shields it becomes apparent why it is important for a spacecraft or orbiting observatory to have rendezvous means or docking means involving separable and connectable components. Not only can the weight penalty be solved but a spaceship can dock within a power system and use it for propulsion on a space journey. It also can dock within a buffer or protective cover or haven of substantial size and be completely overhauled before a space journey or before atmospheric re-entry. The astronauts or space voyagers can even take advantage of a rest period within the haven or port before departing again.

Such a spacecraft cover or haven on this invention is also provided with means for moving the cover forward and backwards to give the occupants of such a craft a wider view of the universe. Also this cover is equipped with portholes so that this apparatus can be used as an orbiting observatory, particularly so when the cover is completely closed.

This protective cover or haven upon this space apparatus is purposely constructed of such substantial thickness to shield against fairly large meteoroids, dust-size meteoroid particles and normal solar and cosmic radiation. However, during times of solar flares, this special haven including the Dry Ice and the vacuum already mentioned will serve as a safe or "block house" for the refuge of astronauts. It becomes very obvious as to why it provides a haven or place of safety since it provides protection against the heat of re-entry, provides protection from bombardment of meteoroids when the craft is passing through a meteroid shower in space, and it provides protection against cosmic radiation and heat-up when the craft is exposed to the harmful penetrating rays of the sun in outer space. It also provides protection against the vacuum environment of space itself since an air lock condition or depressurization vessel can be effected by proper maneuvering and thus the occupants of the craft have a depressurized chamber to prepare themselves for egressing said craft.

Another object of the invention is to provide a spacecraft with an umbrella type apparatus or shuttlecock device that can be extended away from the craft to shield against swarms of meteoroids in outer space and also act as a dust shield. In the event that this umbrella apparatus or shuttlecock device is destroyed or impaired by such collisions with meteoroids it is important to remember again that another such device is available in outer space because like the thousands or orbiting havens, retro systems, or ports the craft can maneuver up to the shuttlecock device and link up with it before re-entry or on another journey through space. Such an umbrella type construction can also be used to shield against the penetrating rays of light radiating from the sun whose heat is much more intense in outer space where there is no atmosphere. Thus, the remainder of the craft or main living quarters could be kept in the shadow of the whole umbrella-like construction.

Perhaps one of the most important objects of this invention is that it provides for means to simulate gravity. Merely by positioning the carbon vanes located on the rear of the craft at any position other than the horizontal position indicated in the drawings and then by firing the extended propulsion rockets under the wing sections it is easily understoood why the exhaust from such rockets will strike the vanes in such canted position and cause the whole craft or apparatus to spin in space. Under such rapid spinning motion the operator or astronaut or other occupants within such a craft can thus be made to overcome the feeling of weightlessness in space as this spinning motion imparts centrifugal force upon these occupants located in the outer periphery of motion and creates a gravitational force similar to that experienced by said occupants or operator on the earth.

Still another object of this invention is that it is provided with a swivel chair within the cabin or cockpit and two control panels. One of these panels, the space flight instrument panel, is equipped for controlling in outer space and the other panel positioned near the front of the craft, the atmospheric control panel, is used for re-entry and maneuvering in an atmosphere. The swivel chair gives the astronaut the added advantage of being able to operate either control panel when it is needed as he can rotate himself or turn his chair to the desired position.

Still another object of the invention is to equip a craft with multiple purpose wings or lifting appendages and extensible propulsion systems for powered flight or for gliding flight, and which also can be used to connect or link up with another craft having similar extensible wing construction. These wings or appendages can be extended outward to overlap the wings of the other craft and then by use of electromagnetic means be secured to each other during a rescue operation in space or for constructing or repairing a larger craft or spaceport. Actually during rendezvous rescue astronauts can walk or crawl upon the overlapped wings and by employing metal cleats on their shoes or feet and the said electromagnetic means walk conveniently across these wings as the attraction set up by electromagnetism will cause their cleats to hold the astronauts in a secure position as each step is taken.

Still another object of the invention is to provide for the composite entry. That is, it should easily be understood now how extensible wings and a propulsion system on this invention, coupled with the multiple purpose serviceable haven or buffer on the front can provide said craft with the composite entry. This type of entry is now possible with this apparatus since the whole spacecraft can enter an atmosphere without lift (no wings) with the propulsion rockets retracted within the fuselage and then at a later stage of re-entry use lift (use wings) and then with the extended rocket propulsion system use powered means and actually fly using the vanes on the rear of the craft to maneuver to a landing on the ground.

In the event of power failure or malfunction with the propulsion system prior to re-entry the multiple purpose wings can be extended in varying degrees and the craft allowed to glide through an atmosphere during re-entry.

One of the purposes of this invention is that it is designed to have features which include means for the most economical procedure of operating such a craft in outer space. That is, this invention provides means by which spacecraft can have multiple flights, use the same craft over and over again, be serviced while in space flight without returning to earth or to a planet, have maneuvering means to link up with or dock within various protective covers or havens, power systems, shuttlecock drags, and also be very convenient in the construction of space platforms. It can even be used itself in the process of forming a platform because it can be used to ferry materials, men, and components from the earth or other planet or from other space platforms. It also has powered means to travel or fly anywhere in interstellar space and can fly from one spaceport or space haven to another, and itself be used as a scientific laboratory and space station.

It is believed that this invention solves a lot of the major problems confronting scientists in present day space exploration. Utilizing spinning means or rotational means upon a spacecraft to simulate gravity and thus induce the occupants to overcome the feeling of weightlessness in space is very vital to the health of said occupants. Since the entire space cabin or space apparatus will have to be kept clear of bacteria to prevent illness it is of vital concern to provide such a craft with venting means so that foreign materials, dust, bacteria, and perhaps even waste materials can be eliminated from the living quarters by such venting means or vacuum cleaning method. Perhaps even hair clippings from haircuts given to the crew members of such a craft will have to be vacuumed together as soon as it is cut to prevent it from floating around during weightlessness. With this invention not everything will have to be launched from earth. Weight is the deciding factor in most cases, but where extremely critical life support systems are concerned, duplicate life support systems can be installed on a space station or placed into orbit by such a shuttle craft and a maximum capability of utilizing thousands of orbiting components with multiple purpose functions for in-flight repair or servicing can be utilized to tremendous advantage. Weight will not be such a penalty since other components can be docked within before re-entry or journey to other planets. Even the bubbles in liquids undergoing weightlessness can be eliminated by the spinning means mentioned heretofore and man's own physical reaction in space will be no different than that experienced on earth since the gravitational forces on earth can be reasonably assimilated.

The usefulness of a refrigeratory apparatus within this invention and other objects of the invention as well as the apparent advantages of the multiple purpose components mentioned herein will be more readily comprehended by those skilled in the art as reference is made to the following detailed description when considered in connection with the accompanying drawings, wherein:

FIG. 6 is a partial cross sectional view of the haven or enclosure for safety with modifications showing one of its extensible and retractable appendages in side elevation with it in complete extended position with part of the appendage cross sectioned to clearly indicate the openings therein and the stair step construction, FIG. 8a illustrates the invention in orbiting position showing one arrangement comprising the blunt protective haven on one end of the craft and the retro rocket system on the other end whereby these multiple purpose components while in this position can use the retro system as a power system to change direction of flight and actually fly in an opposite direction in space, or use said retro system to brake the apparatus so that the protective haven will separate from the front of the craft and remain in orbit, or whereby the retro system can be used to help maneuver the craft into the haven during docking or rendezvous procedure, or to slow the whole apparatus prior to re-entry so that atmospheric re-entry can take place, or use the retro system to slow the orbital velocity enough to alter the orbital altitude.

Figure 1:
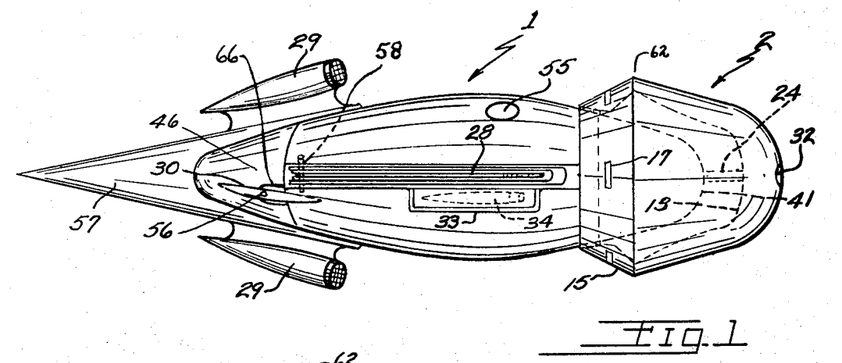
FIG. 1 is a side elevation illustrating the invention with the various multiple purpose components such as the power system and/or rocket system used for retro procedure located on the rear end, the protective haven or blunt shaped buffer on the other end of front end and indicating the retracted position of the extensible type wings and extensible type rocket propulsion systems which move outwardly together when actuated and this illustration shows how the invention would appear immediately after the craft has rendezvoused or docked within said retro system and said haven in outer space.
Figure 2:
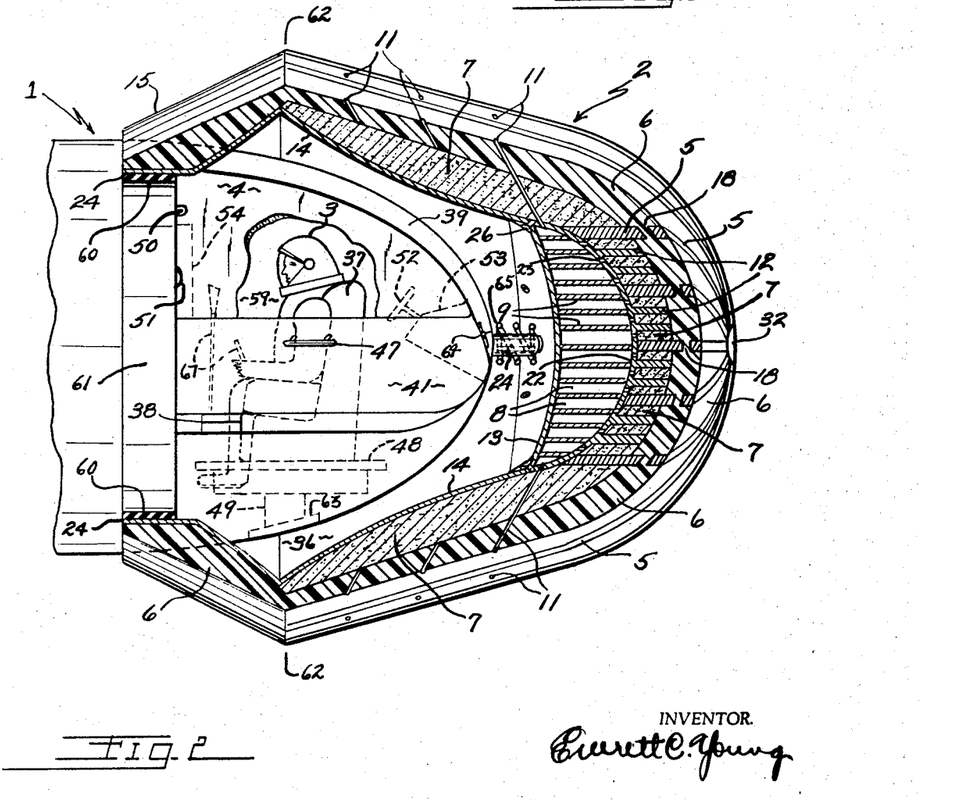
FIG. 2 is a partial sectional elevation view of the protective haven or buffer cover illustrating the servicing arrangement after the craft has completely docked, the materials and construction of which are clearly cross sectioned to illustrate the refuge or enclosure for safety of the astronaut, showing also the components and arrangements of materials with various melting and kindling temperatures which provide differential ablation as well as the refrigeratory apparatus or honeycomb matrix containing Dry Ice which alongside the vacuum space between the quarters for the astronaut and the interior surfaces of the haven is located in insulating position in front of said quarters.

Referring to FIG. 1 and FIG. 2 in the drawings I have illustrated the invention comprising a spacecraft fuselage 1 and its nose portion 41 after a completed docking maneuver and it is very obvious how the protective haven or blunt shaped buffer 2 has received the fuselage 1 and the nose portion 41 to thereby service the spacecraft fuselage 1 with an insulative cover or enclosure around the cockpit 59 to offer the astronaut 3 a place of safety during atmospheric reentry or during a space flight through a meteoroid shower. By such docking procedure it is apparent why a vacuum space 36 is entrapped or enclosed by the cylindrical telescoping construction 24.

Figure 8A:
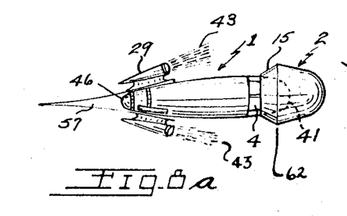
FIG. 8b illustrates that the craft has rendezvoused with the haven or buffer on the front and the multiple purpose retro rockets are being removed by air pressure buildup as the whole spacecraft including the haven descends at high velocity into the denser atmosphere while the retro rockets take on another trajectory and burn up during their fiery descent.
FIG. 8c shows the buffer or haven and spacecraft fuselage descending further within the denser atmosphere whereby the heat on the front of the haven is being dissipated laterally away from the sides of the craft, and whereby the shuttlecock or umbrella-like device has extended out into the airstream in back of the tail end portion of the craft thus braking or slowing the speed of the whole apparatus so considerably that the haven falls away as shown and burns up or disintegrates during its fiery descent.
FIG. 8d illustrates how a completely unique and sophisticated flying vehicle is made airborne by extensible wings, and other aerodynamic vane control surfaces as well as the shuttlecock configuration shown at the rear which affords the necessary stability and braking action needed for reduction of speed to assume a powered maneuverable position or a gliding approach for flight to a landing.

In FIG. 1 and FIG. 8a the invention is illustrated in side elevation showing one orbiting arrangement comprising the haven or buffer 2 on one end of a spacecraft fuselage 1 and the powerful retro rocket system 29 comprised of four rockets on the other end whereby the whole apparatus while in this position can perform a number of particular functions, which are more particularly the following:

(1) By use of the power system or retro rocket system 29 the apparatus can be made to change direction of flight in space and actually fly in an opposite direction utilizing the thrust from the powerful rocket system 29.

(2) These same retro rockets 29 can be used to apply thrust to brake the apparatus so that the protective haven or buffer 2 will separate from the front of the spacecraft fuselage 1 and remain in orbit for future use by another spacecraft having a similar docking arrangement.

(3) This retro rocket system 29 can also be used to help maneuver the craft into the haven or buffer 2 during docking or rendezvous procedure in space flight by slowing the speed prior to retrieving the haven 2 and by firing the desired rocket for thrust to maneuver into correct position.

(4) The retro system 29 can also be used to slow the orbital velocity of the apparatus to thereby alter the orbital altitude.

(5) While in this position in the orbital path or even returning from a space journey the whole apparatus can be braked by the retro rockets 29 so that gravitational forces will overcome the apparatus and cause it to commence atmospheric re-entry.

Figure 3:
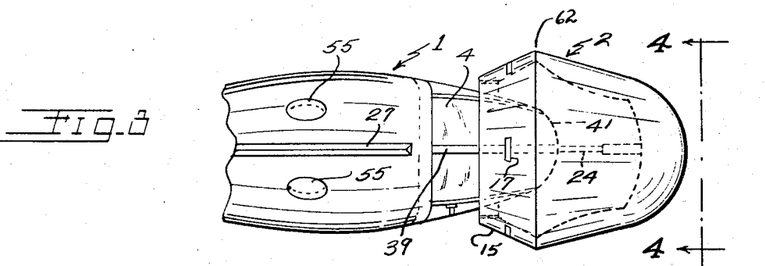
FIG. 3 is a top view of the multiple purpose haven illustrating the orbiting craft in the process of docking within the haven and this is also the position in which the apparatus would appear when the craft is being braked and whereby the haven or protective buffer is released and due to its orbital speed continues its forward motion and separates from the craft to remain in orbit indefinitely for future servicing of the same craft or other craft.

Note by FIG. 8a and FIG. 3 that the retro rockets 29 are indicated as being fired and the thrust 43 from such firing is intended to perform the five functions mentioned above. Also in this drawing the protective haven or buffer 2 is slightly separated from the spacecraft fuselage 1 and this illustration shows how the whole apparatus appears when the retro system 29 is helping to orient and/or steer the fuselage 1 into the haven 2 during docking or rendezvous procedure. Conversely, this illustration in FIG. 8a and FIG. 3 illustrates that the haven or buffer 2 is in position of separating from the apparatus when the retro rocket system 29 is fired and the apparatus braked. By this method many, perhaps hundreds and thousands of havens or buffers 2, could be placed into orbit for future use by other craft which will have need for servicing prior to re-entry or space journey.

It is important to note by FIG. 1 that when the hypersonic shape 57 of the invention is pointed skyward and the whole apparatus is retained in such position for flight it will, when the powerful retro system 29 is fired, exit the atmosphere. Then when the whole apparatus is in the thin upper portion of the atmosphere or near an orbiting altitude can be made to reach orbital velocity by turning the spacecraft fuselage 1 around by extending the propulsion rockets 34 under the extensible telescoping wings 28 and firing these rockets so that their thrust strikes the carbon vanes 30. Merely by manual operation within the cockpit 59 these vanes 30 can be turned and by proper maneuvering and firing of first one propulsion rocket 34 on one side can actually turn the whole apparatus around 360 degrees and then by turning the vanes 30 parallel with the craft again and firing both rocket systems 34 positioned oppositely each other on both sides of the fuselage 1 and under the wings 28 will propel the apparatus into the correct orbital path and with the right orbital speed required.

Referring again to FIG. 1 and FIG. 2 the haven or buffer 2 has a cylindrical telescoping construction 24 used simultaneously at two places, one of these being where the tapered rear portion 15 of the haven 2 surrounds the entire circular recessed portion 61 adjacent the cockpit 59 whereas this circular recessed portion 61 is encompassed by a gasket 60 and the other one located and slidably secured at a point between the center of the metal bottom support 13 and the tip end of the nose portion 41. As should be readily understood by this mating arrangement it is apparent how conveniently operable it is to actually maneuver a craft into the haven 2 for docking and rendezvous purposes. It is also apparent how the whole fuselage 1 can be made to move backward or forward with such a mating arrangement by controlling within the cockpit 59 and by using the thrust from the retro system 29 or the thrust from the extended propulsion rockets 34.

Referring now to FIG. 1 and FIG. 6 the tapered rear portion 15 of the haven or buffer 2 has portholes 17 placed around its periphery. It is easily comprehended now as to why this haven 2 presents an orbiting observatory as the astronaut 3 can look out the portholes 17 and have a position commanding a wide view of the universe and of the earth. Also by placing the haven 2 in a forward position as shown in FIG. 3 and FIG. 8a the astronaut 3 can take photographic pictures very conveniently with such an adjustable arrangement. It should be easily understood now how the haven or buffer 2 when made much larger can house a number of men or women who can service a spacecraft when it docks within said haven 2. Also it is apparent that when the haven 2 is constructed of mammoth size several or perhaps many mating arrangements or docking devices similar to this arrangement illustrated in the drawings can be used upon the haven or buffer 2 and then means whereby more than one spacecraft can dock and be serviced can be arranged. Actually such an orbiting haven or buffer 2 when made larger or even when a good number of them are attached together could very well provide an orbital servicing platform, orbital scientific laboratory, or even an orbital housing project equipped with small compartments or apartments and all the conveniences of a shopping center or service center on earth.

Figures 11, 12:
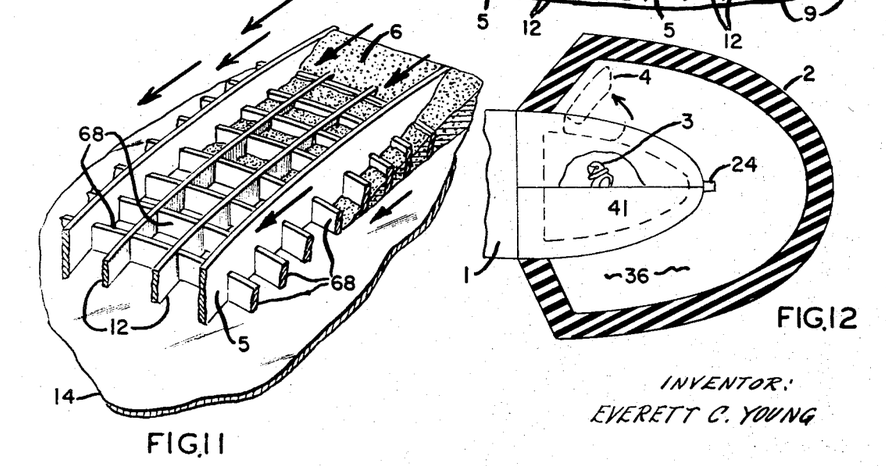
FIGURE 11 is a fragmentary perspective view of a portion of the buffer construction as revealed in FIGURE 6 with a portion of the ablative material removed such as would occur during re-entry ablation.
FIGURE 12 is another drawing showing another embodiment wherein the size of the buffer has been increased to illustrate how the whole apparatus appears after a spacecraft has rendezvoused and docked within the buffer.

FIGURE 12 is another illustration of the invention showing another embodiment of the buffer wherein the size of the buffer 2 has been increased as indicated by the illustration in order to help describe how the haven or buffer can be used as a port or hangar for the astronaut 3 to position his spacecraft cabin within for servicing his craft when the astronaut 3 maneuvers the tapered nose portion into said buffer 2 to complete a docking maneuver.

It is easily comprehendible to determine how the astronaut 3 within the cockpit 59 can position the tapered nose portion 41 of his craft within a larger buffer or haven 2 as indicated by the illustration in FIGURE 12. After rendezvousing with the buffer 2 and positioning the nose portion 41 of his craft inside the buffer 2 as shown in FIGURE 12 the astronaut 3 can then push his canopy 4 upwardly as indicated by the arrow and climb out inside the buffer 2 and service or repair his craft. The nose portion 41 is tapered and this design feature makes it more convenient for the astronaut 3 to position the cockpit 59 and the front portion of the spacecraft fuselage 1 inside the buffer 2. Note that with this enlarged buffer 2 there is much more room in space 36 for the astronaut 3 or other persons to repair or service the spacecraft.

Referring to FIG. 1 and FIG. 3 note that there are two emergency parachute compartments 55 spaced oppositely each other on the top side of the spacecraft fuselage 1. Approximately midway up on opposite sides of the fuselage 1 there are elongated openings or recesses wherein the telescoping wings 28, the cowlings 33, and the propulsion rockets 34 all can be extended or retracted. The rockets 34 are located inside the cowlings 33, and can be moved outwardly away from the fuselage 1 when needed for propulsion. The tapered elongated fuselage 1 is capped on the rear end by a cone 46 and positioned around and over this cone 46 is a hypersonic shape 57 having retro rockets 29, preferably four of these, canted outwardly so that their exhaust will clear the sides of the fuselage 1. Positioned oppositely each other and jutting through slots 66 in the cone 46 are a pair of carbon vanes 30 already previously mentioned which control the pitch, roll, and yaw, of the spacecraft 1 within space and in an atmosphere by swiveling movement upon a pivotal pin 56 and this movement actuated through control system 67 operated by the astronaut 3 illustrated in FIG. 2. In FIG. 1 it can easily be seen how the spacecraft fuselage 1 and/or the whole multiple purpose apparatus can have centrifugal force imparted to it while in space. That is, the astronaut 3 merely by pivoting the carbon vanes 30 simultaneously at a set angle of approximately 45 degrees with respect to the longitudinal axis of the apparatus and then by extending the wings 28, cowlings 33, and the propulsion rockets 34 outwardly away from the fuselage 1 or away from their retracted positions and then by firing these rockets 34 the exhaust from such firing will strike the canted or turned vanes 30. It should be obvious as to why the whole craft or fuselage 1 and the whole apparatus with its multiple purpose components will start immediately to spin about an axis located within the proximity of the center of the craft 1 or about near the area of the rockets 34. Thus by spinning the whole apparatus in outer space gravity can be simulated whereby the astronaut 3 positioned near the end of the apparatus and at the outer circumferential edge of the spinning motion can overcome the feeling of weightlessness which he experienced prior to such spinning action. It is important to note here that when these vanes 30 are turned 45 degrees clockwise and the rockets 34 fired then the whole apparatus will spin counter clockwise. Conversely, if the vanes 30 are turned 45 degrees counter clockwise then the whole apparatus will spin clockwise. Also, if one vane 30 on one side of the fuselage 1 is turned clockwise and the other vane on the opposite side is turned counterclockwise with respect to the first turned vane 30 then by firing the rockets 34 will cause the whole craft 1 or whole apparatus to rotate or roll upon an axis along the center of the longitudinal area of the apparatus. Thus by reversing the procedure mentioned above the ship can be made to roll in an opposite direction upon its longitudinal axis.

It is very important to mention here that in the event of malfunction on the part of the retro rockets 29 prior to re-entry then these vanes 30 can be utilized to move the rear end of the craft in such a position that the nose end is pointed toward the earth's atmosphere and then by firing the propulsion rockets 34 can propel the whole craft down into the atmosphere so that re-entry can take place. Thus these vanes 30 provide a safety backup system in the event of failure on the part of retro rockets 29 and should eliminate the hazard whereby an astronaut might become stranded in orbit when his retro systems fail.

Figures 4, 5, 7, 8:
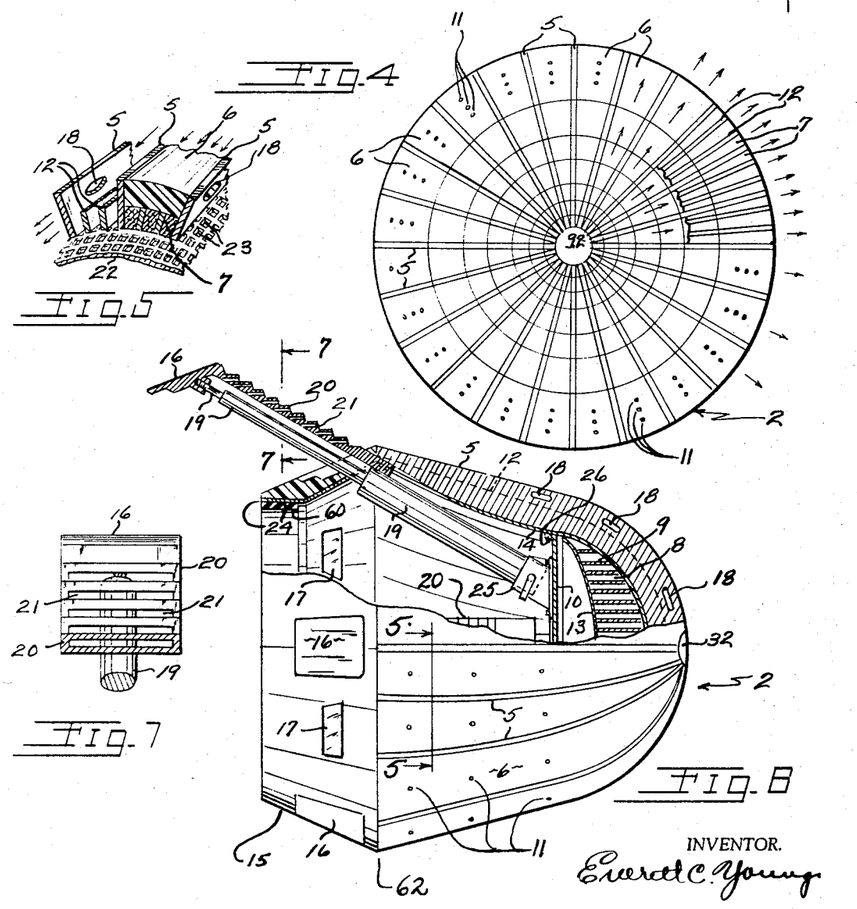
FIG. 4 is an enlarged head-on view of the front of the haven or buffer illustrated in FIG. 3 in which it clearly defines the radial symmetry of the stabilizer fins which are made of beryllium. Rene 41, or columbium or other material with a high kindling temperature and indicated by the pairs of parallel lines emanating from the center of the haven, and the arrows of which show the direction of flow of air and melted or ablated material between the fins comprising phenolic asbestos or other type of plastic having a lower kindling temperature than the fins thereby providing differential ablation on said haven during atmospheric re-entry.
FIG. 5 is a perspective partly in section, of a fragmentary segment removed from the haven illustrated in FIG. 6 showing how the material has been completely removed by aerial frictional ablation and channelled out from between one set of fins in the process of differential ablation, whereas, the adjacent cross section in the same illustration shows how the section would appear before differential ablation and before any material has been removed by aerial friction, and also illustrates the metal netlike construction which appears underneath the fins and sections of materials.
FIG. 7 is a cross sectional view of the extended appendage shown in FIG. 6 illustrating the rectangular openings therein and part of the telescoping structure which supports it.

In FIG. 2 and FIG. 4 the pairs of parallel lines emanating from the center 32 of the haven or buffer 2 represent the stabilizer buffer fins 5 which are spaced in radial symmetry about the protective haven 2 and which form tapered plastic segmented sections 6. Beneath the plastic segmented sections 6 are the segmented dry sand cores 7 with vent holes 11 for escaping carbon dioxide gas sublimating from the Dry Ice 8. Tho hollow inside portion of the buffer or haven 2 is lined or formed by a circular metal beryllium shield 14 and a metal bottom support 13 also composed of beryllium. In FIG. 2 the cylindrical telescoping construction 24 is in retracted position after docking has been fully completed and thus forms a space 36 between the nose portion 41, the beryllium shield 14, and the circular bottom support 13 for enclosing a vacuum before re-entry into the atmosphere or for insulative purposes in outer space when the hot rays of the sun are upon the protective cover or haven 2 of the spacecraft 1. Thus servicing the docked craft 1 with a vacuum in outer space is easily accomplished since the astronaut 3 merely moves the protective haven or buffer 2 forward from the fuselage 1 to vent the apparatus in the case whereby the space or vessel 36 contained pressurized oxygen and then by such venting the pressurized oxygen will escape into the vacuum of space. In such a manner by venting it is easily understood as to how any compartment or chamber of a craft can be vented to achieve a vacuum condition or depressurized area within so that the astronaut or other occupants can first create a vacuum condition similar to the outer space environment before egressing the craft. Also it is important to mention that this venting means or depressurization means can be utilized conveniently when a craft has rendezvoused and docked within the haven 2 as before egressing the craft or the cockpit 59 the astronaut 3 can vent his cockpit 59 slightly by first enclosing a vacuum around him within the space 36 by using the adjustable haven 2 which can be moved forward and backward and then by opening a small vent or by opening the canopy 4 gradually he can safely depressurize his quarters and then he can safely egress the cabin or cockpit 59 and by removing the canopy crawl or step into the haven 2. This depressurization method is an important improvement in space exploration because stricken craft can be serviced by such a method and even the rescue of stranded astronauts or passengers in outer space can be carried out successfully by using this rendezvous and docking means. Also merely by using electromagnetic means the extensible wings 28 and the rescue craft can move up close to a stricken craft, overlap their extended wings, and then by using said electromagnetic means remain secured to each other until the rescue operation is completed. Thus by venting the interior of the craft the astronaut 3 can prepare for abandonment of egression of his craft and then climb out upon the overlapped wings 28 and walk across them to the rescue craft. The rescue craft having the same type of depressurizing means can then receive the astronaut and then by closing the haven 2 over the cockpit 59 and by pressurization of the haven 2 again offer the astronaut a pressurized environment to breathe in.

With reference to FIG. 2 note that the astronaut 3 sits in a swivel seat 37 the back and bottom of which are well cushioned and custom made so as to fit the entire rear contour and form of his body. This swivel seat 37 within the approximate center of the cockpit 59 is secured to a turntable 48 which is affixed to a strong pivotal support 49 which is secured to a stationary base 63. A guardrail 39 serves as protection for the glass canopy 4 as the buffer 2 slides over it when it separates from the apparatus as indicated in FIG. 8a and FIG. 3. The cockpit 59 has two instrument control panels, one of these located in front of the astronaut 3 called the space flight instrument panel 54 indicated by a dotted line and the other one located in the front of the nose portion 41 and in back of the astronaut 3 called the atmospheric flight instrument panel 53 also indicated by a dotted line and which has a steering wheel 52 attached thereto. In space flight the astronaut 3 has the added convenience of a pair of cockpit lights 50 indicated by a dotted line above the space flight instrument panel 54. The cockpit 59 is equipped with a control system 67 indicated by dotted lines and another pair of lights much larger in size and light projection than the cockpit lights 50 are the landing lights 51 which are situated outside of the cockpit 59 and the glass canopy 4 and which are positioned on opposite sides of the cockpit 59 and the space flight instrument panel 54. The shock absorber spring 65 serves to cushion the brunt of collision with meteoroids and/or micrometeorites and also to lessen the shock when the craft docks within the haven or buffer 2. This spring 65 also serves to give a smoother ride for the astronaut 3 during re-entry when the buffer 2 is colliding with various densities of the atmosphere. Bolts 26 secure other internal components.

Still referring to FIG. 2 the safety glass canopy 4 and the guard rail 39 are assembled in the factory as a complete unit and then secured to the outer front nose portion 41 by a hinge 64 positioned directly at the point of the nose portion 41. Before leaving the ground for exiting the atmosphere the apparatus is equipped with the insulative haven or buffer 2 comprising the Dry Ice 8. In the same drawing further reference is made to FIG. 2 in which the cross section of the buffer 2 shows the honeycombed protector or honeycomb matrix composed of compartments of Dry Ice 8. The partitions 9 forming the honeycombed protector are secured between the metal bottom support 13 and the hemispherical shape of the metal netlike construction 22 also indicated in FIG. 5. This netlike construction 22 consists of meshes 23 or openings as illustrated in FIG. 5 and the small grill fins 12 are clearly shown. Referring again to FIG. 6 and still to FIG. 5 which is a perspective of a fragmentary segment taken from the buffer or haven 2 illustrated in FIG. 6, it is precisely illustrated how the plastic segmented sections 6 are molded securely in place between the stabilizer fins 5 and further anchored by the flow of plastic through the openings 18 during the molding operation.

Figures 9, 10:
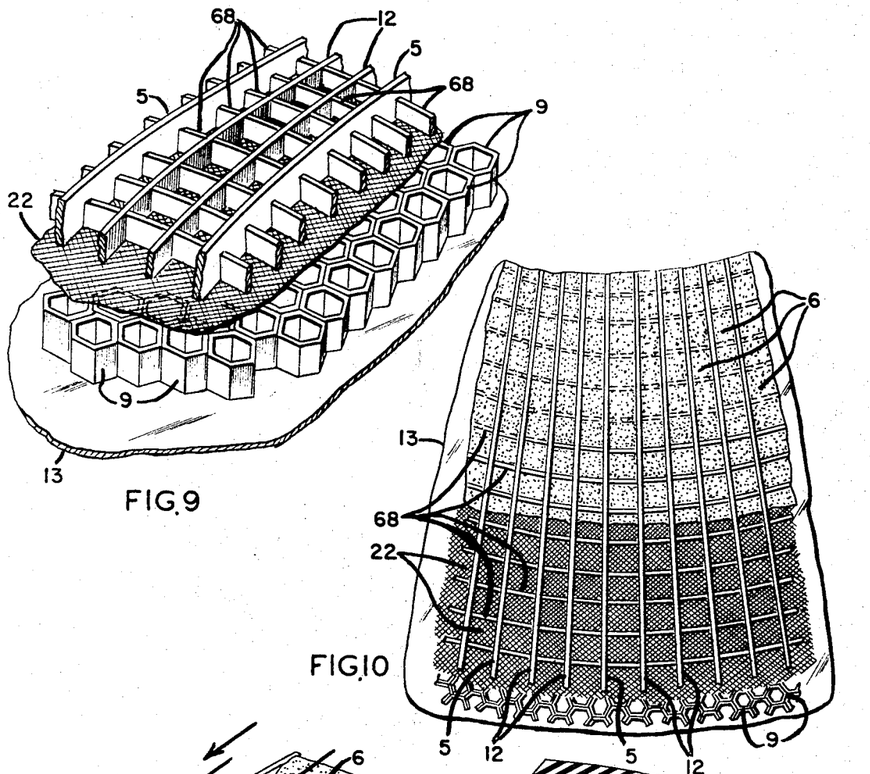
FIGURE 9 is a fragmentary perspective view of a portion of the buffer construction as revealed in FIGURE 2.
FIGURE 10 is a plan view of FIGURE 9 with a portion of the ablative material such as plastic or the like being removed such as would happen during re-entry ablation.

FIGURE 9 is a perspective partly in section, which represents a fragmentary perspective view of the plastic partitions 9 mentioned in the specifications of Patent 3,231,219 column 11 lines 4, 5, 6, and 7, and which also illustrates the optional plan of the shape for partitions 9 in the honeycomb matrix mentioned heretofore. FIGURE 9 illustrates the honyecomb partitions 9 wherein an ablative material such as Dry Ice or other ablative material is located. Note that the honeycomb partitions 9 are positioned upon the metal bottom support 13 illustrated in FIGURE 9 and FIGURE 6. In FIGURE 9 the size of the open ends of the cells in the honeycomb partitions 9 are approximately the true size intended for use but could have a larger or smaller size dependent of course upon the types of materials employed and the desired kindling temperatures needed for differential ablation. The depth of the cells in the cellular structure forming the honeycomb partitions 9 should be of sufficient thickness to allow for differential ablation or thermal decomposition to ablate away surface material necessary for the desired length of re-entry time.

A slight modification of the buffer or haven 2 is illustrated in the drawings in FIG. 6 and FIG. 7 in which one of the four appendages 16 is shown in extended position. This arrangement illustrates how the haven 2 can use extensible or enlargening means to increase its resistance to passage through the atmosphere during re-entry. The buffer or haven 2 is essentially of the same construction as described heretofore but the appendages 16 are spaced equidistantly around the circular tapered rear portion 15 of the buffer 2 and are installed within the invention to make it possible for such enlargening means. It is significant to note that when all four appendages are in extended position each appendage 16 has rectangular openings 21 within the stair step frame 20 and this configuration presents the same function as a shuttlecock since a limited amount of air is allowed to pass through these rectangular openings 21 and a limited amount of air is resisted by the stair step frame 20 as the buffer or haven 2 and the fuselage 1 move at high velocity through the atmosphere during re-entry. Each appendage 16 is extensible and retractable through openings in the side of the rear tapered portion 15 of the buffer 2 and each is supported underneath by a telescoping support device 19 mounted at one end within flange 25 which is affixed to a base plate 10 covering the metal bottom support 13. The retracted position of these appendages 16 can be seen as the rectangular outlines of them are plainly visible on the tapered rear portion 15 in FIG. 6. Even the rectangular portholes 17 can be seen that are spaced equidistantly between these appendages 16. These appendages 16 have two uses. One use is most convenient during re-entry immediately after the critical re-entry time has passed and there is no more ablation taking place on the front surface of the buffer or haven 2. In other words these appendages 16 are to be extended at the lower end of the flight trajectory when the velocity of the spacecraft fuselage 1 and the haven or buffer 2 has been considerably reduced by the ablating buffer 2 said ablation and/or burning producing a natural aerodynamic drag within the surrounding airstream. Also these appandages 16 can be extended during rendezvous with another craft in outer space whereby these projecting appendages 16 are intended to provide means whereby a rescue craft can push itself away from another stricken ship or other ship by merely extending one or more of these appendages 16, especially immediately before firing the propulsion rockets 34 and departing from the said stricken craft. The stairstep frame 20 also provides openings 21 by which an astronaut or other repairmen can grasp with their hands and hold to while making repairs. Another use of the appendages 16 is in the fact that when electromagnetic means is used within the extending appendage 16 will help to secure it to the other craft during rescue operations. This telescoping appendage 16 also serves as a shock absorber as it will help to cushion the impact made made when the two ships come in contact with each other during rendezvous. Therefore when a rescue ship using this appandage 16 bumps the side of another ship while in space the extreme end of the appandage 16 will "give" and move inwardly toward the haven 2 and inside the telescoping support 19.

It is to be understood that the Dry Ice 8 forming an insulative protector within the invention can be stored within the apparatus in its natural or gaseous state consisting of carbon dioxide and then processed into its solid state for insulative means and then through physical retrogression return again to its gaseous state.

In FIG. 2 the metal netlike construction 22 and the metal bottom support 13 are adjacent to the Dry Ice 8 and then bolts 26 are screwed into place around the circumference of the bottom support 13. The stabilizer fins 5, the grill fins 12 and the metal netlike construction 22 can be cast from columbium, molybdenum, or Rene 41, and have a much higher melting or kindling temperature than does the phenolic asbestos or plastic segmented sections 6 between them. It is important to note in FIGURE 6 that the cutaway portion illustrates how the stabilizer fins 5, grill fins 12, and metal netlike construction 22 are filled in completely with ablative material such as plastic or other ablative material as this illustration shows the cross-sectioned area between the anterior surface of the buffer 2 and the honeycomb protector with honeycomb partitions 9. Note that no sand cores appear in this modified cross-section. Reinforcement of the plastic 6 and the grill fins throughout with metal lath-work which has been mentioned heretofore as reinforcement for the ablative dry sand cores in another type of construction is of primary concern here as these metal laths 68 form a metal latticed construction which not only enhances the structural strength of the composite structure of the buffer 2 but offers a compartmentalized structure with multi-cellular design which aids in holding and containing the ablative materials such as Dry Ice, plastic, or other ablative material in place all over the buffer 2 during re-entry ablation. Such a construction provides for differential ablation since one material will be melting and ablating out before and/or faster than the other material as the buffer 2 bears the brunt of aerial ablation during atmospheric re-entry. In this manner the stabilizer buffer fins 5 protrude more and more on the front of the haven or buffer 2 since these fins 5 have a higher kindling temperature and since the plastic segmented sections 6 with the lower kindling temperature melt or ablate out between the fins 5. Under such ablating conditions the protruding fins 5 then act as stabilizers to maintain the buffer 2 and the fuselage 1 in an upright position during high speed re-entry, thus aiding the pilot or astronaut 3 to sit upright in piloting position for convenient controlling of his craft.

FIGURE 9, FIGURE 10, and FIGURE 11 are drawings which show fragmentary segments taken from the buffer or haven 2 illustrated in FIGURE 2 and FIGURE 6 and these illustrations show precisely too, how this buffer invention represents in particular an ablative protective cover comprising various composite structures with functionally different ablation modes of which each composite structure comprises a compartmentalized framework with various special ablative materials or fillers in the compartments and cellular design of said framework. FIGURE 9 and FIGURE 10 are fragmentary views which illustrate the finned construction which forms the framework composed of the fins 5, grill fins 12, and reinforcing metal lath members 68. Note that this finned framework with multicellular design is positioned atop the metal netlike construction 22 in FIGURE 9 and FIGURE 10 and that the honeycomb protector with honeycomb plastic partitions 9 is positioned between said netlike construction 22 and the metal bottom support 13. FIGURE 9 shows the finned or cellular framework on top the metal netlike construction 22 emptied of any ablative material such as plastic 6 or the like and the honeycomb partitions 9 underneath said netlike construction 22 also emptied of any ablative filler such as Dry Ice 8 or other ablative material. FIGURE 10 shows a plan view of the finned framework composed of the supporting metal lath 68, fins 5, and grill fins 12 and this finned framework is intended to cover the whole anteriorly disposed portion of the buffer 2.

Note that the ablative material 6 or the like is illustrated in FIGURE 10 as being partially removed by ablation thus exposing the metal mesh or metal netlike construction 22 underneath and exposing also part of the honeycomb partitions 9 which form the honeycomb matrix. Also note in FIGURE 11 wherein the ablative material such as plastic 6 or the like is partially ablated away in the direction indicated by the arrows whereas some of the material is left filling some of the finned or latticed framework. FIGURE 11 is a variation of FIGURE 9 and FIGURE 10 in that this perspective fragmentary segment is taken from the area of the buffer immediately behind the honeycomb partitions 9 illustrated in FIGURE 6 wherein it shows the stabilizer fins 5 and grill fins 12 butted against the inner beryllium shield 14. Note here again that this framework forms a finned lattice-like construction for holding and containing the ablative material such as plastic or the like 6 in multi-cellular partitions.

Still referring to FIG. 2 it is important to mention that the sand cores 7 scatter the unmelted or unburned material out away from the spacecraft fuselage 1 by slippage movement when the said material is swept across the sandy surface by aerial friction. Such a scattering method provides a boundary layer within said haven or buffer 2 whereby the ablation and/or burning on the front during re-entry can be terminated. During such termination this eliminates momentarily the ionized condition surrounding the spacecraft and therefore radio communications can be carried out with earth control centers.

It is important to note in FIG. 2 that before atmospheric re-entry this multiple purpose haven or buffer 2 has a substantially blunt shape or hemispherical shape. Then after the plastic sections 6 and the sand cores 7 have been ablated away during the critical re-entry velocity another entirely different shape has been exposed by such aerial carving and this shape is somewhat akin to a streamline shape or hypersonic configuration as indicated by the outline of the beryllium shield 14. Therefore an important feature of this invention and the multiple purpose haven 2 is that it has the improvement of exposing two distinctly different shapes to aerial friction during re-entry. That is, at the start of atmospheric re-entry a blunt shaped configuration of the special haven or buffer 2 faces the aerial friction and/or ablation of high speed re-entry and then at the latter stage of the re-entry trajectory and after the front of the haven 2 has been substantially carved away by ablation a new and entirely different configuration or streamlined shape is exposed to transient reaction with an atmosphere. This new shape illustrated by the outline of the beryllium shield 14 is well indicated in the partial sectional elevation view of the haven or buffer in FIG. 2.

The enclosed vacuum in the space 36 behind the beryllium shield 14 provides a good insulator against the possible penetration of heat by convection or conduction in the case of a poorly manufactured buffer or haven 2. Also, since a vacuum cannot prevent radiated heat then further protection is offered by the Dry Ice 8 which maintains the adjacent materials in a super cooled state before re-entry and during re-entry and therefore these very cold or frozen materials ablating during such entry will not experience any heat penetration since new fresh cold material is exposed as fast as the exterior is ablated away. Then, too, the Dry Ice 8 itself prevents radiated heat 100 percent since it dissipates any heat laterally 100 percent.

Therefore, since this apparatus with all of its multiple purpose components can be used either as an orbiting space observatory or as a rescue ship or shuttle craft to ferry men and supplies back and forth from earth to a space station, or carry such men and supplies from one space station to another, or even from one planet to another planet it is very important then to explain and/or describe the whole re-entry procedure. In FIG. 8a and referring to FIG. 3 and FIG 2 the astronaut 3 observes the firing thrust 43 of the retro rockets 29 and then in FIG. 8b the illustration shows that his craft has been slowed or braked enough by the retro rockets 29 that gravitational forces affect his craft and the whole multiple purpose apparatus with the protective haven or buffer 2 and retro rocket system 29 commence to fall into the atmosphere at high speed of over 10,000 miles per hour. During the start of this descent the retro rockets 29 are removed by air resistance and these are released so that they take on another trajectory as indicated by the drawing in FIG. 8b forming a tapering fire 42 with the hypersonic shape 57 producing a fiery tail.

Figures 8B, 8C, 8D:
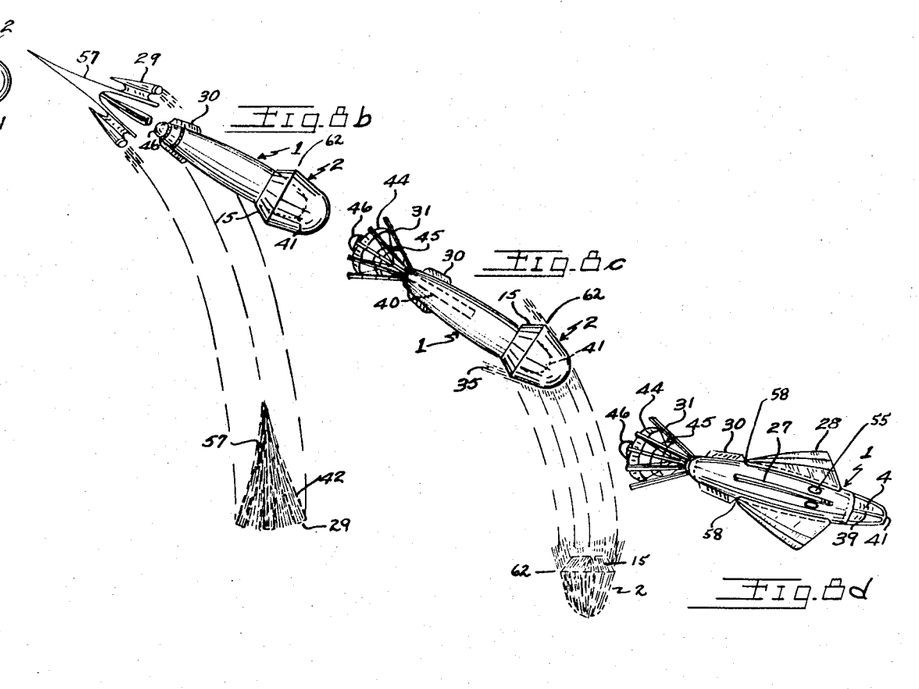

FIG. 8c illustrates the closed position of the haven 2 over the craft or fuselage 1 and how the buffer or haven 2 is burning or ablating which is indicated by the flame 35 which forms a fiery sheath about the apex 62. Immediately after the ablating stage has passed and the aerial friction strikes the sand cores 7 shown in FIG. 2 a shuttlecock configuration is extended from the rear and this configuration comprises elongated support bars 31, a wind sock 45, a chain mail chute 44, and a cone 46. This configuration, housed within a long circular tube 40 indicated by a dotted line within the fuselage 1, can be extended or retracted with this tube or the whole shuttlecock configuration can be ablated off by setting it afire with the use of flammable liquids during re-entry. It would not be difficult to set up an atomizing device upon the craft 1 so that a flammable liquid could be sprayed on to the shuttlecock drag device. Frictional heat induced by aerial resistance will cause the drag to commence burning and with the help of a flammable liquid set up quite a tail of fire which will naturally produce an aerodynamic drag in the airstream around the fiery drag and thus slow the speed of the craft or fuselage 1.

It is important to mention here, too, that when this shuttlecock configuration is extended in outer space the chain mail chute 44 and its related supporting construction is used for shielding against meteoroid showers and also for protection against the harmful rays of the sun. By maneuvering the whole multiple purpose invention in space the umbrella-like chain mail chute 44 can be positioned so as to shadow the whole craft or fuselage 1, the cockpit 59, and the haven 2. Since, as mentioned before, thousands of these shuttlecock drags can be placed into orbit for future use by spaceships it is easily comprehendible why any one of them could be rendezvoused with and used not only as a drag brake during re-entry but as an umbrella-like shield during journeys through space. This umbrella-like shield could not only stop the heat from the penetrating rays of light from the sun but this chain mail chute 44 is very effective in shielding against impact with meteoroids when the craft is entering a meteoroid shower in space. This chain mail chute 44 is very flexible and in some instances during impact with a meteoroid would actually catch and hold it.

It is also quite possible for the astronaut 3 using the depressurizing means already mentioned to egress his craft and crawl back along the top side of his craft and/or fuselage 1 and then using the support bars 31 hold onto them and make his way back into the flexible chain mail chute 44. Once within this chute 44 he can recline in a comfortable position and perhaps set up a camera to take pictures of interesting phenomena in the universe.

FIG. 8c shows how the shuttlecock drag on the rear of the craft has slowed it so that the haven or buffer 2 separates from the front and falls to its fiery descent. Then in FIG. 8d the same shuttlecock drag is being used to further slow and stabilize the craft for maneuverable flight only a few miles above the earth's surface.

FIG. 8d also shows that the extensible wings 28 have extended to flying position and it is important to note that these wings 28 have three sections which are illustrated here. Such a construction of sectional telescoping wings 28 gives the craft variable sweep wings and are very functional in various types of environments where the air pressure or density varies. Also these wings can be extended outwardly in a fanning or swinging movement by use of a pivotal pin 58 to the proper position for various speeds in an atmosphere. That is, after the critical re-entry velocity has been reached and the craft commences to slow up the haven or buffer 2 falls away and then these wings 28 move out one section at a time. By looking at the illustration in FIG. 8d one can see the three sections of wing on both sides of the fuselage 1. The inner section next to the fuselage 1 is for hypersonic speed, the outer section of the wing in this position along with the other sections represents the lifting surface for subsonic speeds, and the middle section of the wing between the inner and outer sections already mentioned is for supersonic speeds. The stabilizer fin 27 indicated in FIG. 8d is a rather long fin and it also extends upward from the fuselage 1 to help in stabilizing the flight of the whole craft. The carbon vanes 30 directly behind the wings 28 are clearly indicated in FIG. 8d and these vanes are very essential to controlling the craft when flying to a landing. The shuttlecock drag illustrated here is in full extended position but it can be retracted within the body of the fuselage 1.

One of the most important advantages of this invention with multiple purpose components is that it employs a swivel chair 37 for the astronaut 3. With such a versatile arrangement the astronaut 3 can operate two control panels merely by turning or rotating this chair 37. A swivel chair 37 or any swiveling arrangement for a pilot or pilots in a spacecraft is essential because it eliminates the conventional procedure used in present day re-entry whereby the whole spacecraft or capsule has to be turned around prior to re-entry. Using such a swivel arrangement would be especially important on space vehicles attempting a landing on the moon or other celestial body because the occupants of such vehicles need only to turn their seats before landing. In present day vehicles it is evidenced that plans are being made for the vehicle to turn around before landing and use retro rockets to permit a soft landing. With this invention the craft can actually fly to a landing on the moon where there is no atmosphere because the use of the carbon vanes 30 aids in controlling the craft in the correct direction with the right attitude. With these vanes 30, the swivel chair 37, the propulsion system 34, and the fact that the gravitational forces above the moon's surface is approximately one-sixth of the gravitational force on earth it is easily comprehendible as to why this invention should be able to make a soft landing on the moon by flying under powered means and with manned control.

Still another important advantage is that this invention offers another safety backup system. Should either the retro rockets 29 fail or the propulsion rockets 34 malfunction then the astronaut 3 can extend the wings 28 for a gliding re-entry through earth's atmosphere, and then if needed, use the shuttlecock drag to make a landing on the ground. On the other hand, should the astronaut 3 feel that this gliding approach is not according to plan then he may if he so chooses use the pair of parachutes 55 positioned within the fuselage 1 indicated in FIG. 1 and FIG. 3, and thus permit his craft to make a parachute landing. Should his craft be parachuted over water areas he would have no concern because his ship will land in an upright position and he can sit upright in his cockpit 59 until his rescuers reach him. These parachutes 55 are located in the center of gravity on the ship and since the fuselage 1 can easily employ buoyant chambers or devices within its body for floating the ship, thus will be able to float upon the water like a boat. The astronaut 3 when leaving the craft can then open the canopy 4 grab the handle 47 and using the metal step 38 right outside the cockpit 59 step down and go with his rescuers.

What is claimed is:

1. Forced burning means including a reinforced plastic-type material on the heat shielding portion of a spacecraft of the type used for atmospheric re-entry said portion being exposed to the elevated temperatures created during atmospheric re-entry and including materials in a composite construction having in part a multi-cavity matrix as one constituent and another constituent as the ablative filler in said cavities of said matrix; the improvement of support means on said shielding portion whereby said matrix being constructed into minute multi-cavities that form cellular compartments forming a honeycombwork can support and hold said ablative filler in the cells thereof while said filler is being subjected to re-entry heat when exposed to said elevated temperatures thereby affording a means for controlling the rate of re-entry heat absorption while eliminating uncontrolled burning.

2. A re-entry heat shield comprising in part a multi-partition design having a metal netlike construction forwardly disposed and open directly to re-entry heat during a period of atmospheric re-entry, said shield comprised of constituents which have functionally different ablation temperatures.

3. A re-entry heat shield comprising in part a multi-partition design having a metallic compartmentalized construction, said shield comprised of constituents which have functionally different ablation temperatures.

4. A heat shield for re-entry craft having a heat dissipating device forwardly disposed comprising in part at least one ablative organic element, said device also including a finned matrix comprising a plurality of compartments having cellular-like structure whereby said device with said finned matrix and ablative element is employed in part to dissipate heat during re-entry; the improved feature being the combination of said matrix with said ablative element being supported in said cellular structure, both said matrix and said ablative element having functionally different ablation temperatures when exposed to elevated temperatures during atmospheric re-entry.

5. A protective and partially destructible aeronautical buffer for re-entry spacecraft having a control quarters said buffer comprising in part a multicavity compartmentalized structure having a sub-structure attached thereto and embracing said quarters, including constituents having functionally different ablation modes, said compartmentalized structure comprising at least in part a combustible organic constituent including temperature control means whereby temperature of decomposition of said constituents during critical re-entry remains substantially controlled over said surface of said compartmentalized structure during aerodynamically induced endothermic reactions during said re-entry when the velocity of said craft is at its maximum; the improved protective feature of locating said compartmentalized structure in a position whereby said substructure and said structure form at least in part a protective cover for said control quarters of said spacecraft said buffer also comprising in part a reinforced plastic-type composition designed to embrace said structure and said sub-structure thereby providing a forwardly disposed ablative protector intended for early decomposition during said critical re-entry.

6. The buffer as defined in claim 5 wherein said plastic-type composition is comprised of a make-up having at least one organic compound said composition comprising a structure having early premature ablative characteristics when subjected to re-entry ablation.

7. The buffer as defined in claim 5 wherein said compartmentalized structure is a honeycomb structure and said composition is a composite having similar functionally different ablation modes as said constituents said composition comprising premature ablation means on the anteriorly disposed surface of said buffer during early stage of re-entry.

8. The heat shielding portion of a spacecraft as defined in claim 1 wherein said honeycombwork is nonmetallic.

9. A spacecraft apparatus designed to include a control cabin having capability of transporting at least one operator in said cabin, said apparatus comprising an inner structure housing said cabin and an outer protective sheath enclosing both said cabin and said inner structure, said sheath having an ablative-type composite construction comprising in part a multi-partition design forming a matrix, said matrix supporting an ablative material positioned within its partitions, said multi-partition design formed of material having a higher ablation temperature than said supported ablative material, the improvement comprising said supported ablative material formed of a plastic composition that is subject to ablation before the ablation of said multi-partition design thereby providing for differential and controlled ablation of said composite construction during atmospheric re-entry and thereby effectively dissipating heat from the spacecraft and preventing heat penetration.

10. A space vehicle comprising a body having propulsion means for flight in a spatial vacuum and in an atmosphere and including means for braking during re-entry, said vehicle having incorporated in its design wing means and re-entry means including an ablative buffer said buffer having in part a composite construction comprising a cellular structure having a multi-cell compartmentalized matrix with an ablative filler located in the cells thereof.

11. The space vehicle as defined in claim 10 wherein said filler in said ablative buffer is comprised of a sublimative type of material having a lower ablation temperature than said matrix.

12. The apparatus as defined in claim 9 wherein said inner structure is a multi-partition design comprising a honeycomb protector including a plastic make-up.

13. A buffer on the front end of a spacecraft comprising means for orienting said spacecraft including means for differential ablation whereby the forwardly disposed materials of said buffer ablate at different rates when imposed by high velocity re-entry, said spacecraft capable of self-powered flight in a spatial vacuum and in an atmosphere comprising braking means on said spacecraft, said spacecraft including in its design an aerospace vehicle with re-entry means, and said buffer having in part a composite structure comprising a cellular construction having a multicell compartmentalized matrix with an ablative filler located in the cells thereof; the improvement whereby said re-entry means includes differential ablation means on the surface of said composite structure during early re-entry and separating means whereby said buffer and said vehicle can be separated.

14. A manned re-entry vehicle comprising a buffer, said buffer having a substantially blunt shaped configuration which is made in part of a plastic make-up and which is subjected to ablation during re-entry to thereby produce a fiery sheath about said buffer, said vehicle comprising at least two components capable of enveloping pressurized oxygen within said vehicle including venting means whereby a portion of said vehicle can be depressurized by opening a part of said portion in a spatial vacuum and the further improvement of safely offsetting the imbalance of pressures between said pressure environment and said spatial vacuum by regulated selective movement means whereby escapement of said oxygen can be controlled.

15. In combination with a re-entry vehicle of the type used in space travel and exposed to heat during atmospheric re-entry, a buffer encompassing the forward portion of said vehicle that is exposed to the elevated temperatures created during re-entry, said buffer being constructed into segmented sections that form cellular compartments, an ablative material provided in said cellular compartments and being subjected to ablation during re-entry.

16. The invention of claim 15 wherein a portion of said segmented sections are constructed as stabilizer fins, said stabilizer fins and cellular compartments being exposed to atmosphere through the ablation of the ablative material during re-entry thereby enhancing the control of the vehicle during this stage of its space travel.

17. The invention of claim 15 wherein said segmented sections are subject to ablation during re-entry at a temperature range differing from the temperature of ablation of said ablative material thereby providing for a differential ablation of the buffer during re-entry from space travel.

18. A manned rescue vehicle comprising male and female components and adaptable to travel in space and in an atmosphere comprising docking means and venting means; the improvement of said docking means on said vehicle in said space whereby rendezvous between said components can be effectively carried out, and the further improvement of said venting means whereby said components can be separated for depressurization and to safely transfer a pilot from one vehicle to another.

19. A space haven comprising linking means whereby a re-entry craft can link up with said haven during flight in space and separating means whereby said craft and said haven can be separated in said space, said haven having a substantially blunt shaped protective buffer comprising in part a composite compartmentalized construction capable of withstanding aerial erosion during atmospheric re-entry; the improvement of aerial erosive modification means on said buffer whereby said blunt shaped buffer is exposed to said erosion during critical re-entry when the velocity of said re-entry craft is greatest and whereby said erosion exposes another configuration within said buffer having a substantially less blunt shape with streamlined profile and the further improvement of said modification means whereby said buffer can be carved to a streamlined shape more aerodynamically appropriate for reducing the resistance to passage through an atmosphere whereby temperature rate of ablation is minimized and aerodynamically induced pressure and "g" loads on the forwardly disposed surface of said buffer are substantially reduced thereby minimizing the shock wave ahead of said buffer and said craft.

20. A protective buffer having in part a composite construction comprising, in combination, a rigid multi-partite matrix having multi-segmented sections, an ablative filler located between the segmented sections of said matrix, and the structural extremities of the leading surfaces of said matrix coinciding with the anterior surfaces of said segmented ablative sections to form a substantially dome shaped configuration, said buffer being used on a spacecraft and producing endothermic reactions during re-entry to progressively ablate differentially the forward surface of said composite construction and thereby improve the aerodynamic properties of said buffer surface while simultaneously effecting heat dissipation for protection of said spacecraft.

21. The buffer as defined in claim 20 wherein said ablative filler is a material with a lower ablation temperature than the ablation temperature of said matrix.

22. The buffer as defined in claim 20 wherein said matrix is metallic.

23. In combination with a manned re-entry body comprising a buffer providing for differential ablation, said buffer being combustible during early high-speed entrance of said body into an atmosphere, said body capable of being launched from atop a rocket launching device, and comprising a blunt aeronautical construction on one end for enclosing the control quarters of said body, and having control vane means pivotally mounted on the opposite end of said body, means for operating said control vane means whereby after lift off said vanes can be employed to steer said body in flight.

24. A manned spacecraft capable of self powered flight in interstellar space and in an atmosphere capable of linking up with a containable enclosure containing at least one combustible material said enclosure separably affixed to said craft including insulating means tending to maintain said material indefinitely; the improved feature of said insulating means including Dry Ice to prevent vaporization of said combustible material and the further improvement whereby said containable enclosure can be separated from said craft and left in orbit for future combustible use by said craft.

25. The buffer as defined in claim 20 wherein said filler located between said segmented sections of said matrix is supported at least in part by another matrix forming a honeycomb protector.

26. A substantially thick heat shield for re-entry craft comprising an aeronautical heat protection device having a forwardly disposed re-entry surface portion of finned compartmentalized construction; the improved feature of employing a composite comprising said finned construction and an ablative type plastic make-up located in the compartments formed by said construction both said finned construction and said plastic make-up having different kindling temperatures whereby said composite when experiencing aerodynamically induced combustion during re-entry will result in a heat protection scheme producing functionally different ablation temperatures whereby said plastic make-up dissipates the heat of re-entry while at the same time said finned construction enhances the physical characteristics of said composite by continuously maintaining uniform distribution of ablation during re-entry thereby greatly influencing the aerodynamic properties of said re-entry surface portion during said re-entry.

27. A substantially thick heat shield for re-entry craft comprising an aeronautical heat protection device having a forwardly disposed re-entry surface portion composed of a metallic latticed and finned framework divided into substantially multi-cellular fashion and forming cellular walls said walls supporting and containing plastic segmented sections open directly to re-entry heat; the improved feature of uniformly distributed ablation on said portion by employing an ablative type plastic composition for said segmented sections to dissipate said re-entry heat during atmospheric re-entry and the further improved feature of support means whereby said framework with said cellular walls support and contain said composition while said heat protection device is experiencing aerodynamically induced endothermic reactions during said re-entry.

28. A re-entry heat shield comprising in part a composite structure comprised of constituents which have functionally different ablation temperatures; the improved feature of employing in part in said shield a compartmentalized protector with honeycomb cells whereby uniform ablation can be effected during re-entry and the further improved feature of support means whereby the ablator in said cells can be simultaneously supported and contained while said protector is open directly to re-entry heat.

29. A manned re-entry vehicle comprising a combustible type heat shield said shield designed for combustible stage of re-entry and having a substantially blunt shaped configuration said configuration made at least in part of combustible material having a plastic make-up and which is subjected to combustion to thereby produce a fiery sheath about said shield resulting from transient reaction with an atmosphere during re-entry, said shield comprising an ablative type aeronautical heat protection device having in part a forwardly disposed composite surface portion open to re-entry heat directly during at least a part of the time span of said combustible stage during said re-entry said composite surface portion comprising a rigid metallic multi-compartmented design forming in part a metallic radiator like grill-finned netlike matrix substantially throughout said design and said design bonded to a substrate, said composite portion having structural extremities of the leading edge components of said surface portion coinciding with each other to form said blunt shaped configuration; the improved feature of employing an ablative plastic make-up in the compartments of said multi-compartmented design to dissipate heat in substantially uniform manner during re-entry by employing ablative characteristics having a functionally different ablation mode than said matrix and the further improvement of support means whereby said plastic make-up in said compartmented design is held and contained by metal cell-like constructions formed by said metallic grill-finned netlike matrix and said constructions having cell walls holding said plastic make-up and maintaining it in substantially its original shape while said composite surface portion is exposed directly to said re-entry heat during atmospheric re-entry.

30. The apparatus as recited in claim 10 wherein said space vehicle comprises joinable means and separable means between said body and said re-entry means.

31. The space vehicle defined in claim 10 wherein said vehicle comprises variable sweep wings and means for exiting and reentering a planetary atmosphere.

References Cited

UNITED STATES PATENTS

| | | | |
|---|---|---|---|
| 2,018,608 | 10/1935 | Dubois | 62—385 X |
| 2,395,435 | 2/1946 | Thompson et al. | 244—74 X |
| 3,026,806 | 3/1962 | Runton et al. | 244—117 |
| 3,093,346 | 6/1963 | Faget et al. | 244—1 |
| 3,118,636 | 1/1964 | Kantrowitz | 244—1 |
| 3,119,576 | 1/1964 | Nielsen | 244—1 |
| 3,144,219 | 8/1964 | Schnitzer | 244—1 |
| 3,169,725 | 2/1965 | Berglund | 244—1 |
| 3,204,892 | 9/1965 | Powell | 244—43 |
| 3,210,026 | 10/1965 | Frisch | 244—1 |
| 3,210,233 | 10/1965 | Kummer et al. | 244—117 |
| 3,268,091 | 8/1966 | Melton | 244—1 |
| 3,289,974 | 12/1966 | Cohen et al. | 244—1 |

FOREIGN PATENTS 1,168,802  4/1964  Germany.

OTHER REFERENCES

Aviation Week and Space Technology: vol. 77, Issue No. 5 July 30, 1962. p. 63 244/1.

Interavia July, 1960 pp. 860 and 861 244/1.

FERGUS S. MIDDLETON, *Primary Examiner.*

U.S. Cl. X.R.

102—105, 161—68